US008079588B2

(12) United States Patent
Stemmle

(10) Patent No.: US 8,079,588 B2
(45) Date of Patent: Dec. 20, 2011

(54) MAILPIECE CONTAINER FOR STACKING MIXED MAIL AND METHOD FOR STACKING MAIL THEREIN

(75) Inventor: Denis J. Stemmle, Stratford, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 539 days.

(21) Appl. No.: 12/390,103

(22) Filed: Feb. 20, 2009

(65) Prior Publication Data

US 2009/0152811 A1 Jun. 18, 2009

Related U.S. Application Data

(62) Division of application No. 11/487,203, filed on Jul. 13, 2006, now Pat. No. 7,527,261.

(51) Int. Cl.
*B65H 29/04* (2006.01)
*B65H 29/54* (2006.01)
*B65G 47/00* (2006.01)
*B65G 49/06* (2006.01)

(52) U.S. Cl. ...... 271/206; 271/204; 271/307; 198/803.3

(58) Field of Classification Search .................. 271/207, 271/307, 308, 204, 206, 2, 306, 198; 198/80.14, 198/803.3, 805.5, 476.1, 474.1, 470.1
See application file for complete search history.

(56) References Cited

U.S. PATENT DOCUMENTS 2,852,157 A 9/1958 Frater
2,994,457 A 8/1961 Fornas
3,113,680 A 12/1963 Frater et al.
3,137,499 A 6/1964 Maidment
3,170,594 A 2/1965 Nascher
(Continued)

FOREIGN PATENT DOCUMENTS

JP 1159088 6/1989
(Continued)

OTHER PUBLICATIONS

Final Office Action dated Jan. 28, 2011 in U.S. Appl. No. 12/390,053.
(Continued)

*Primary Examiner* — Kaitlin Joerger
*Assistant Examiner* — Patrick Cicchino
(74) *Attorney, Agent, or Firm* — Leland Schultz; Andrew M. Calderon; Roberts Mlotkowski Safran & Cole, P.C.

(57) ABSTRACT

A system is provided for stacking mail having an escort assembly for handling each mailpiece. The system comprises a containment device, a transport mechanism and a detachment mechanism. The containment device includes a base, vertical walls extending from the base and an open end for accepting the mailpieces therein. The containment device, furthermore, has a slot formed in at least one of the vertical walls thereof. The transport mechanism includes first and second transport segment, the first transport segment conveying escort assemblies and respective mailpieces over an open end of the containment device and the second transport segment lowering the escort assemblies and respective mailpieces into the open end of the containment device. The transport mechanism furthermore aligns the edges of the mailpieces along one of the vertical walls of the containment device and positions the escort assembly through the slot of the containment device. The detachment mechanism is operative to release the mailpieces from the respective escort assembly and move the escort assemblies through the slot of the containment device.

10 Claims, 8 Drawing Sheets

U.S. PATENT DOCUMENTS 3,341,063 A 9/1967 Voorhees, Jr.
3,404,804 A 10/1968 Frater et al.
3,420,368 A 1/1969 Sorrells
3,452,509 A 7/1969 Hauer
3,478,892 A 11/1969 Lockwood
3,498,494 A 3/1970 Voorhees, Jr.
3,534,866 A 10/1970 Asenbauer
3,549,145 A * 12/1970 Trautmann .................... 271/184
3,587,856 A 6/1971 Lemelson
RE27,649 E 5/1973 Levenhagen
3,750,892 A 8/1973 Grosse
3,757,939 A 9/1973 Henig
3,889,811 A 6/1975 Yoshimura
3,901,797 A 8/1975 Storace
3,904,516 A 9/1975 Chiba
3,905,896 A 9/1975 Jackson
3,933,094 A 1/1976 Murphy
4,008,813 A 2/1977 Leersnijder
4,058,217 A 11/1977 Vaughan
4,106,636 A 8/1978 Ouimet
4,139,098 A 2/1979 Mollon
D251,586 S 4/1979 Levenhagen
4,169,529 A 10/1979 Hunter
4,244,672 A 1/1981 Lund
4,320,894 A 3/1982 Reist
4,371,157 A 2/1983 Hunt
4,445,681 A * 5/1984 Reist ............................. 271/300
4,498,664 A * 2/1985 Reist ............................. 271/204
4,507,739 A 3/1985 Haruki
4,550,837 A 11/1985 Simmons
4,550,905 A 11/1985 Heiland
4,570,798 A 2/1986 Wilson
4,627,540 A 12/1986 Takeda
4,641,753 A 2/1987 Tamada
4,688,678 A 8/1987 Zue
4,738,368 A 4/1988 Shaw
4,757,890 A 7/1988 Motoda
4,836,354 A 6/1989 Motoda
4,868,570 A 9/1989 Davis
4,874,281 A 10/1989 Bergerioux
4,891,088 A 1/1990 Svyatsky
4,895,242 A 1/1990 Michel
4,905,986 A 3/1990 Muller
4,921,107 A 5/1990 Hofer
4,923,022 A 5/1990 Hsieh
4,965,829 A 10/1990 Lemelson
4,987,634 A 1/1991 Weihrauch
5,031,223 A 7/1991 Rosenbaum
5,042,667 A 8/1991 Keough
5,071,008 A 12/1991 Hradisky
5,119,954 A 6/1992 Svyatsky
5,144,895 A 9/1992 Murray
5,186,336 A 2/1993 Pippin
5,226,641 A 7/1993 Schieleit
5,291,002 A 3/1994 Agnew
5,295,674 A 3/1994 Zoltner
5,370,382 A * 12/1994 Wetter .......................... 271/183
5,413,324 A 5/1995 Flade
5,425,837 A * 6/1995 Hansch ......................... 156/536
5,445,397 A 8/1995 Evans
5,470,427 A 11/1995 Mikel
5,480,032 A 1/1996 Pippin
5,503,388 A 4/1996 Guenther et al.
5,549,359 A 8/1996 Hoss et al.
5,667,078 A 9/1997 Walach
5,718,321 A 2/1998 Brugger
5,772,391 A * 6/1998 Sjogren et al. ............. 414/790.9
5,797,249 A 8/1998 Hartness
5,860,527 A 1/1999 Frankenberg et al.
5,881,902 A 3/1999 Ackermann
5,981,891 A 11/1999 Yamashita
6,047,853 A 4/2000 Frankenberg
6,062,388 A 5/2000 Ohayon
6,126,017 A 10/2000 Hours
6,170,689 B1 1/2001 Flesher et al.
6,189,695 B1 2/2001 Ching-rong
6,227,378 B1 5/2001 Jones
6,276,509 B1 8/2001 Schuster
6,347,710 B1 2/2002 Ryan
6,365,862 B1 4/2002 Miller
6,394,274 B1 5/2002 Cheeseman
6,394,449 B1 5/2002 Reist
6,403,906 B1 6/2002 De Leo
6,435,353 B2 8/2002 Ryan
6,435,583 B1 8/2002 Reist
6,443,311 B2 9/2002 Hendrickson
6,464,067 B1 10/2002 Reist
6,527,122 B1 3/2003 Taylor
6,561,339 B1 5/2003 Olson
6,561,360 B1 5/2003 Kalm
6,612,563 B1 9/2003 Nole, Jr.
6,634,846 B1 10/2003 Enenkel
6,677,548 B2 1/2004 Robu
6,726,201 B2 4/2004 Studer
6,746,202 B2 6/2004 Mader
6,747,231 B1 6/2004 Bretschneider
6,749,268 B1 6/2004 Wheeler et al.
6,762,384 B1 7/2004 Kechel
6,814,210 B1 11/2004 Hendzel
6,880,705 B2 4/2005 Otting et al.
6,897,395 B2 5/2005 Shiibashi
6,946,612 B2 9/2005 Morikawa
6,953,906 B2 10/2005 Burns
6,976,675 B2 12/2005 Gosslinghoff
6,994,220 B2 2/2006 Schererz
7,004,396 B1 2/2006 Quine
7,111,742 B1 9/2006 Zimmermann
7,112,031 B2 9/2006 Harres
7,138,596 B2 11/2006 Pippin
7,170,024 B2 1/2007 Burns
7,210,893 B1 5/2007 Overman
7,227,094 B2 6/2007 Oexle
7,235,756 B2 6/2007 De Leo
7,259,346 B2 8/2007 Svyatsky
7,304,260 B2 12/2007 Boller
7,378,610 B2 5/2008 Umezawa
7,396,011 B2 7/2008 Svyatsky
7,397,010 B2 7/2008 Wilke
7,397,011 B2 7/2008 Berdelle-Hilge
7,527,261 B2 5/2009 Stemmle
7,721,891 B2 5/2010 Dubois
D621,619 S 8/2010 Ripoll
7,784,615 B2 8/2010 Stahl
7,954,816 B2 * 6/2011 Freitag et al. ................. 271/277
2002/0053533 A1 5/2002 Brehm
2002/0125177 A1 9/2002 Burns
2002/0139726 A1 10/2002 Roth
2002/0153228 A1 10/2002 Kramer
2003/0006174 A1 1/2003 Harres
2003/0079626 A1 5/2003 Yoshitani
2003/0111468 A1 6/2003 Kao
2003/0136713 A1 7/2003 Lopez
2003/0155282 A1 8/2003 Kechel
2003/0208298 A1 11/2003 Edmonds
2003/0209473 A1 11/2003 Brinkley
2003/0218296 A1 11/2003 Honegger
2003/0218297 A1 11/2003 Honegger
2004/0007510 A1 1/2004 Kechel
2005/0025340 A1 2/2005 Hickman
2005/0096783 A1 5/2005 Mileaf et al.
2005/0161875 A1 * 7/2005 Yuyama et al. ................... 271/2
2005/0189270 A1 9/2005 Lindenmayer
2005/0222708 A1 10/2005 Wisniewski
2006/0070929 A1 4/2006 Fry
2006/0124512 A1 6/2006 Quine
2006/0180520 A1 8/2006 Ehrat
2006/0191822 A1 8/2006 Avant
2006/0237341 A1 10/2006 McDade
2007/0090029 A1 4/2007 Avant
2007/0131593 A1 6/2007 Burns
2007/0194519 A1 8/2007 Belanger
2007/0272601 A1 11/2007 Cormack
2008/0011653 A1 1/2008 Stemmle
2008/0012211 A1 1/2008 Stemmle
2008/0027986 A1 1/2008 Stemmle
2008/0093273 A1 4/2008 Stemmle
2008/0093274 A1 4/2008 Stemmle

| | | | | |
|---|---|---|---|---|
| 2008/0164185 | A1 | 7/2008 | Stemmle | |
| 2009/0230614 | A1* | 9/2009 | Meier | 271/204 |
| 2010/0270125 | A1* | 10/2010 | Bijl | 198/470.1 |

FOREIGN PATENT DOCUMENTS

| | | |
|---|---|---|
| JP | 1271789 | 10/1989 |
| WO | 94/04287 | 3/1994 |
| WO | 01/08817 | 8/2001 |
| WO | PCT/US2005/04406 | 6/2006 |
| WO | PCT/US2005/044560 | 6/2006 |
| WO | PCT/US2005044413 | 6/2006 |
| WO | PCT/US2006/012861 | 10/2006 |
| WO | PCT/US2006/012888 | 10/2006 |
| WO | PCT/US2006012892 | 10/2006 |

OTHER PUBLICATIONS

Final Office Action dated Nov. 12, 2010 in U.S. Appl. No. 12/390,053.

Office Action dated May 13, 2010 in U.S. Appl. No. 12/390,053.

Office Action dated Sep. 17, 2009 in U.S. Appl. No. 12/390,053.

Final Office Action dated Aug. 18, 2010 in U.S. Appl. No. 12/390,105.

Office Action dated Mar. 22, 2010 in U.S. Appl. No. 12/390,105.

"Development of in-process skew and shift adjusting mechanism for paper handling," American Society of Mechanical Engineers http://www.directtextbook.com, 1998.

* cited by examiner

MAILPIECE CONTAINER FOR STACKING MIXED MAIL AND METHOD FOR STACKING MAIL THEREIN

CROSS REFERENCE TO RELATED APPLICATIONS

The present application is a divisional application of U.S. application Ser. No. 11/487,203, filed on Jul. 13, 2006 now U.S. Pat. No. 7,527,261, the contents of which are incorporated by reference herein in their entirety.

TECHNICAL FIELD

The invention disclosed herein relates to containers, and more particularly to a mailpiece container adapted for accepting and stacking mixed mail therein which is sorted into route sequence. The invention also describes a method for stacking mail into such containers using a mixed mail sorter.

BACKGROUND ART

The 2003 Presidential Commission Report on the Future of the USPS concluded that the Postal Service should continue to develop effective merging systems that optimize efficiency, e.g., maximize the number of mailpieces shipped with each mile traveled, while minimizing the labor content associated with mailpiece handling. With respect to the latter, all elements of the mail stream (letters, flats, periodicals, post cards, etc.) should be sorted, merged, and/or sequenced at a centralized location with the expectation that no subsequent handling would be required at each of the local postal branch offices, other than the physical delivery to the recipient address.

Most postal services are actively exploring opportunities to reduce the overall cost of processing mail by investing in postal automation equipment and employing state-of-the-art materials management techniques to improve efficiencies in the various process steps. In some instances, the savings from automation equipment may be, unfortunately, offset by increases in transportation costs.

Sorting equipment typically loads mailpieces by a gravity feed chute which drops mailpieces vertically into mail trays arranged below the chute. Occasionally, especially as the mail trays are nearly completely filled, portions of the mailpieces do not settle properly and partially protrude/extend above the top of the tray. As such, a substantial risk is incurred that the protruding mailpiece will catch on mechanisms related to the automated processing equipment, e.g., one of the tray transporting, storing, and/or retrieving systems. It will, therefore, be appreciated that such interference can damage the mailpiece or, alternatively, require system shut down to rectify the problem/obstruction. Further, the overall efficiency of the mail sortation system is adversely affected by these stacking errors.

Stacking errors can occur as a result of a variety non-optimum conditions and/or under a variety of circumstances. In one instance, a non-uniform thickness profile of the stacked envelopes can lead to one side of the stack being higher in the tray than the opposing side. In yet other instances, the stacking of mixed mail, e.g., a combination of flats-, letter-, and postcard-sized mailpieces, can result in a similar inconsistent or non-level stack profile. It will be appreciated that when mixed mail is aligned along at least one edge, letter and postcard-sized envelopes, which may be less than one-half the length of flats mailpieces, will leave a thickness void in regions where a flat envelope would otherwise extend the full length and maintain uniform thickness of the stack.

To address the difficulties associated with stacking errors, mailpiece equipment manufacturers have typically employed one of two known methods/solutions. Firstly, the tray capacity may be limited to about 70% of the total potential capacity. As such, the probability that a mailpiece will protrude beyond the bounds of the container is significantly diminished. Many of the current sorters are equipped with sensors to determine when the height of the mailpiece stack reaches seventy percent (70%) of full level. Secondly, sensors may be deployed throughout the tray transport system to detect when or if mailpieces protrude beyond the top of the container/tray. Trays which have been over-filled are typically diverted to a secondary track for an operator to manually correct the stacking error and return the tray to the primary or principle track.

While these solutions eliminate difficulties associated with equipment jamming or malfunction, the mailpiece container trays are not filled to full capacity. As a result, the containers are shipped with thirty percent (30%) of its volume in air rather than in mailpiece content material. Additionally, the labor cost in operating multi-million dollar sorting equipment remains high due to the human intervention required to correct the stacking errors.

A need, therefore, exists for a system and method to accommodate mixed mail, including mail of inconsistent thickness, to optimally fill mail containers/trays.

BRIEF DESCRIPTION OF THE DRAWINGS

The accompanying drawings illustrate presently preferred embodiments of the invention, and, together with the general description given above and the detailed description given below, serve to explain the principles of the invention. As shown throughout the drawings, like reference numerals designate like or corresponding parts.

SUMMARY OF THE INVENTION

Figure 1:
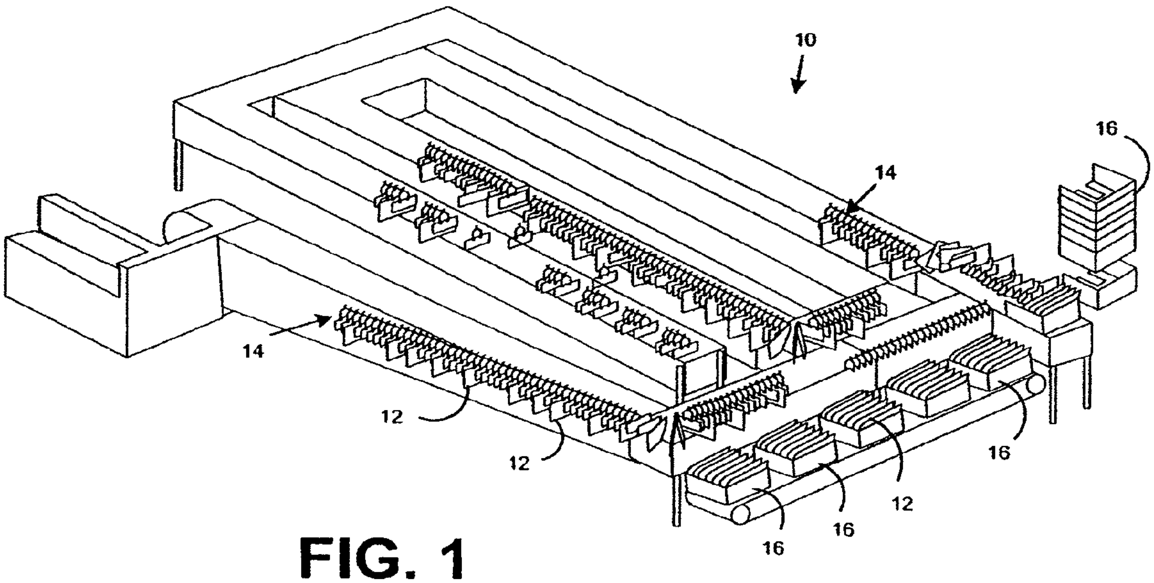
FIG. 1 is a perspective view of a mixed mail sorter having a plurality of escort assemblies for securing, diverting, transporting and releasing mailpieces of mixed variety.

A system is provided for stacking mail having an escort assembly for handling each mailpiece. The system comprises a containment device, a transport mechanism and a detachment mechanism. The containment device includes a base, vertical walls extending from the base and an open end for accepting the mailpieces therein. The containment device, furthermore, has a slot formed in at least one of the vertical walls thereof. The transport mechanism includes first and second transport segment, the first transport segment conveying escort assemblies and respective mailpieces over an open end of the containment device and the second transport segment lowering the escort assemblies and respective mailpieces into the open end of the containment device. The transport mechanism furthermore aligns the edges of the mailpieces along one of the vertical walls of the containment device and positions the escort assembly through the slot of the containment device. The detachment mechanism is operative to release the mailpieces from the respective escort assembly and move the escort assemblies through the slot of the containment device.

DETAILED DESCRIPTION

The present invention is described in the context of a mixed mail sorter for sorting mailpieces and then automatically stacking them into a plurality of mail trays. While the invention is advantageous for mixed mail sorters, it should be appreciated, that the system and method for stacking mailpieces is applicable to any apparatus which may employ an escort assembly for securing, conveying and depositing objects into a container, whether the container is intended for delivering mail, storing objects and/or stacking objects/mail in a containment device.

The invention describes a system for stacking mail into a containment device wherein the mail previously sorted may be stacked after sorting is completed. In the context used herein, the term "containment device" means a container for stacking mail along at least one edge, whether or not the container is used in the transport of mail, i.e., in a transport vehicle, or an interim container used to stack/align the mail and subsequently depositing the mailpieces in yet another transport container. Furthermore, the invention describes various modifications made to such a containment device for use in combination with a mixed mail sorter. That is, inasmuch as mixed mail sorters of the type described utilize a plurality of escort assemblies to secure, divert, transport and release objects/mailpieces into the containment device, various structural modifications are made to accommodate automated stacking therein. Moreover, such modifications may be made to maintain alignment of the objects/mailpieces while being transported i.e., subject to abrupt accelerations and/or vibrations during vehicle transport.

Co-pending, commonly-owned U.S. patent application Ser. No. 11/487,202 entitled "Apparatus and Method for Positioning Objects/Mailpieces" describes an apparatus for centering objects/mailpieces within an escort/clamp assembly for use in a mixed mail sorter. The mixed-mail sorter is described in greater detail in co-pending, commonly owned US patent applications:

PCT/US2005/044560 (WO 2006/063204) (corresponding to U.S. Ser. No. 11/885,231;

PCT/US2005/044413 (WO 2006/063125) (corresponding to U.S. Ser. No. 11/885,242);

PCT/US2005/044406 (WO 2006/063121) (corresponding to U.S. Ser. No. 11/487,202);

PCT/US2006/012892 (WO 2006/110486) (corresponding to U.S. Ser. No. 11/856,174);

PCT/US2006/012861 (WO 2006/110465) (corresponding to U.S. Ser. No. 11/856,299);

and PCT/US2006/012888 (WO 2006/110484) (corresponding to U.S. Ser. No. 11/856,120, the contents of which are incorporated by reference in their entirety.

FIG. 1 shows a typical mixed mail sorter 10 designed to accept mailpieces 12 into an escort assembly 14. The escort assembly 14 is operative to secure, transport, divert and release the mailpieces into one of a multiplicity of containment devices 16 such as a conventional mail tray. In the context used herein, the term escort assembly means any device which may be used for securing objects/mailpieces, transporting the objects/mailpieces through at least part of a handling operation such as automated mail sorting. In the preferred embodiment, the escort assembly 14 is a clamp assembly; however, the escort assembly 14 may also include wire form cages, movable pocket assemblies (i.e., having a trap door) and similar mechanisms. For the purposes of subsequent discussion, the terms "escort assembly" and "clamp assembly" may be used interchangeably.

Figure 2:
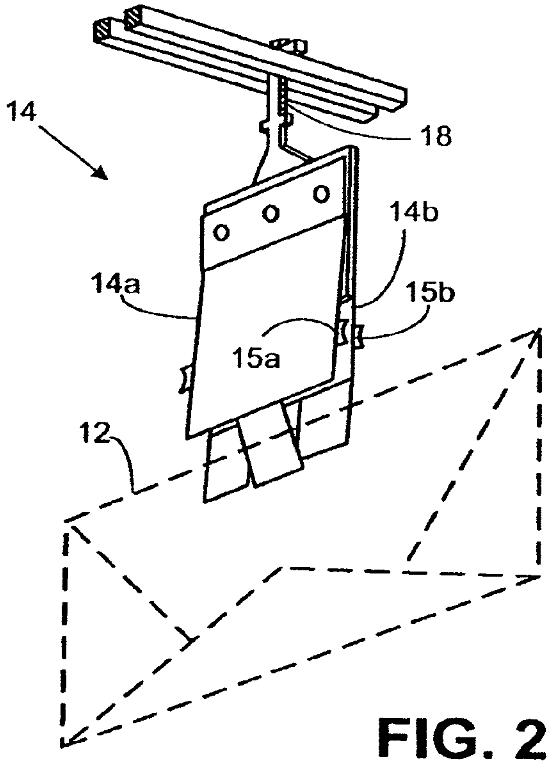
FIG. 2 is an isolated perspective view of an escort assembly for retaining mailpieces wherein the escort assembly is hung from and secured to an overhead transport mechanism.

In FIG. 2, the clamp assembly 14 may include jaws 14*a*, 14*b* which are spring biased to a closed position for holding/securing a mailpiece 12 therein. The jaws 14*a*, 14*b* may be separated to an open position for releasing the mailpiece by a cam mechanism (shown in subsequent views) acting on tabs 15*a*, 15*b* disposed on each side of the jaws 14*a*, 14*b*. The functional operation of the cam mechanism will be discussed in greater detail when discussing the release of each mailpiece into one of the containment devices 16.

In addition to its principle mechanical functions, the clamp assembly 14 may also include a unique identifier 18, e.g., a barcode or RFID chip, to uniquely identify the clamp. As such, the sorting operation may be directed by a controller using a combination of requisite information, i.e., electronically scanned information in connection with the mailpiece (for example, its destination address) together with the unique identifier of the escort assembly. Further, the sorting process may be performed without altering/marking the mailpiece 12 such as via a printed barcode symbology or other identification mark.

Figure 3A:
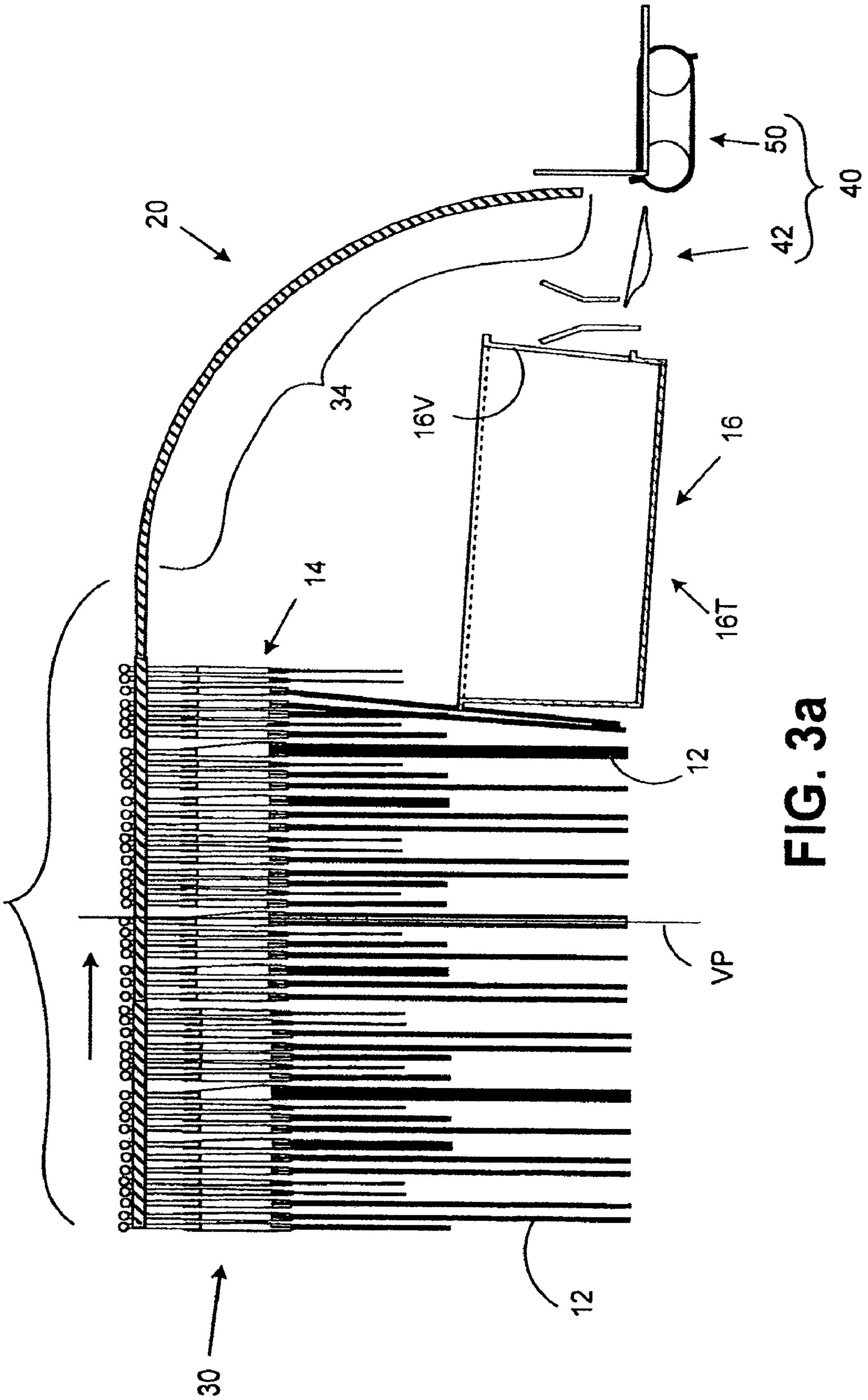
FIGS. 3*a*-3*c* depict side views of a first embodiment of the inventive system in various operational positions, the system including a containment device, a transport mechanism for conveying the escort assemblies over and into an open end of the containment device, and a detachment mechanism.
Figure 3B:
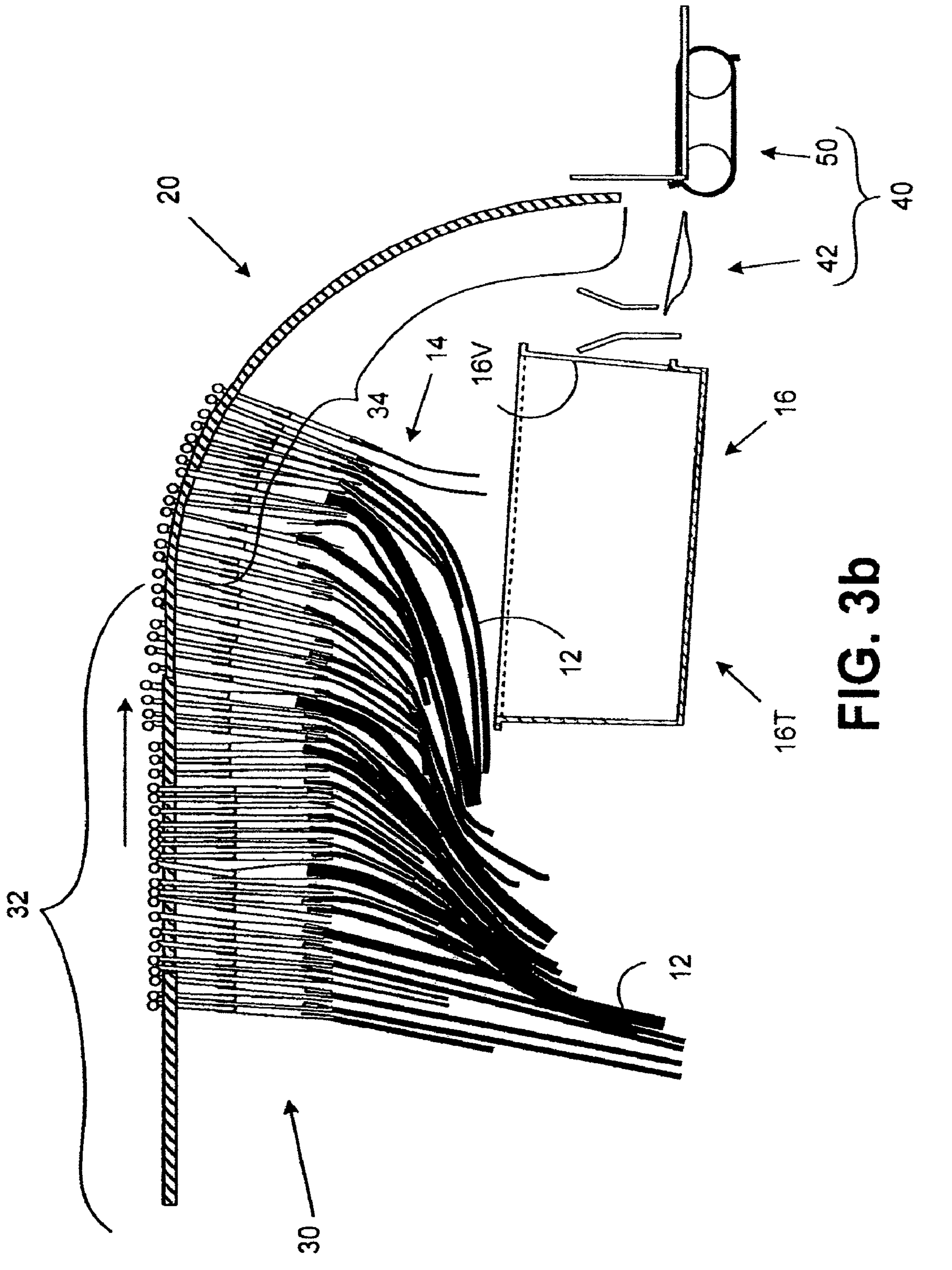
Figure 3C:
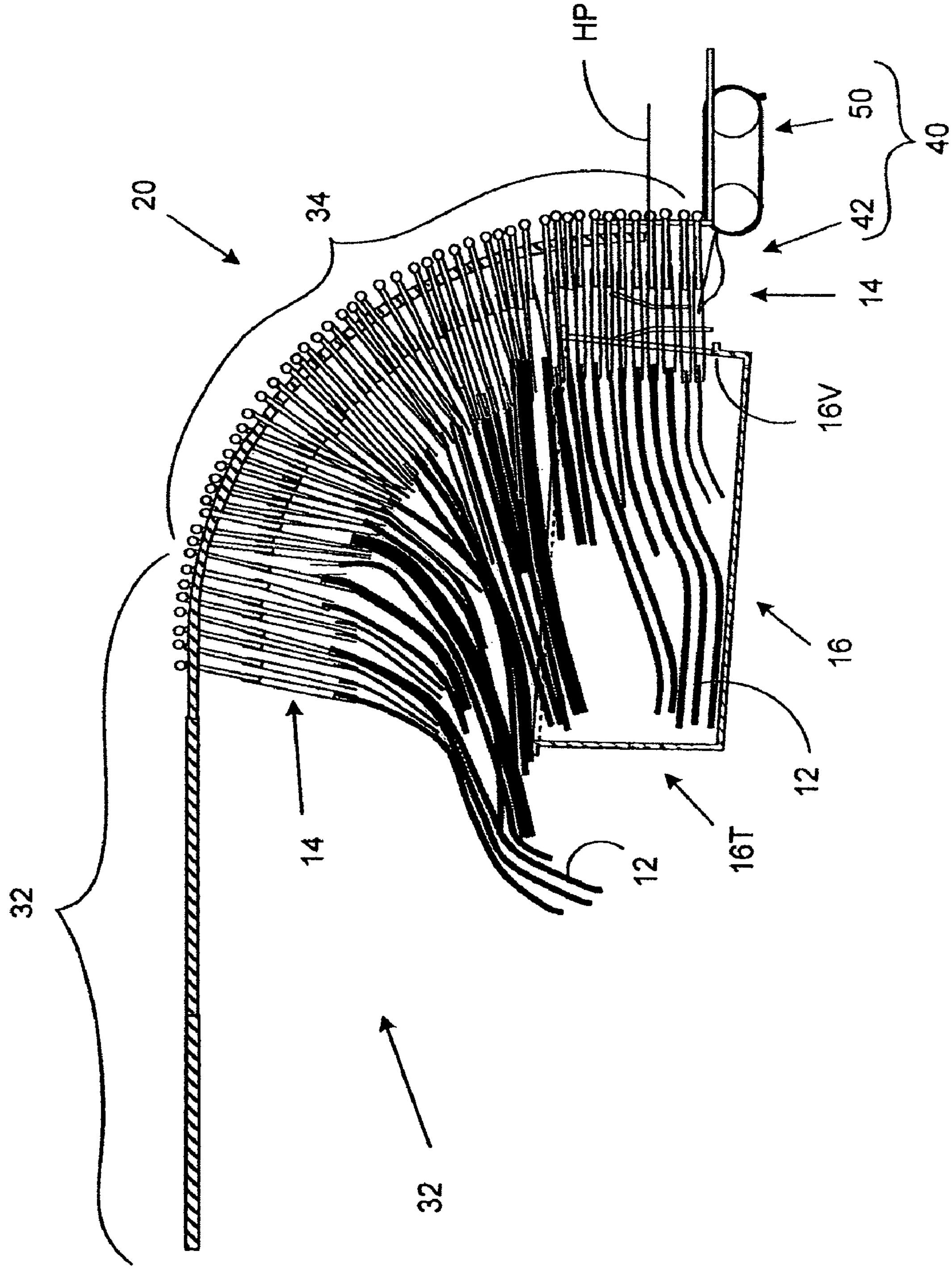

In the broadest sense of the invention and referring to FIGS. 3*a*-3*c*, the system 20 includes a containment device 16 which has been specifically modified or adapted to accept the passage of a clamp assembly 14, a transport mechanism 30 for transporting and conveying mailpieces 12 into an open end of the containment device 16, and a detachment/release mechanism 40 for opening the jaws of the clamp assembly 14 while being moved/pulled through a vertical wall 16V of the containment device 16.

Figure 4:
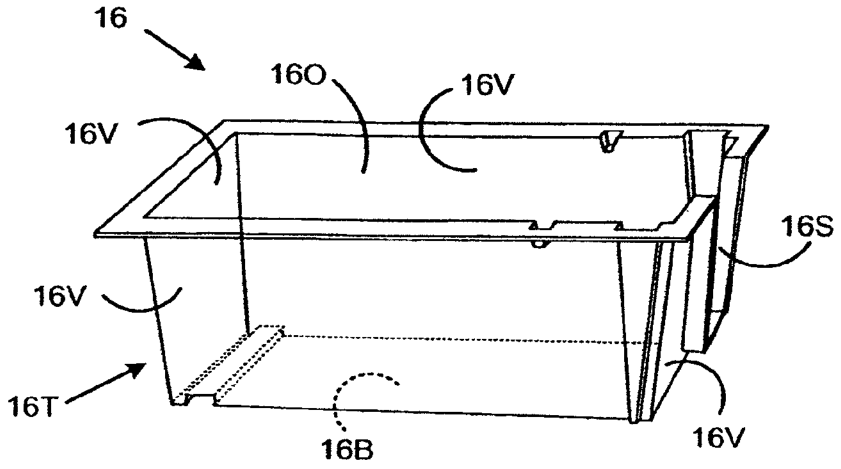
FIG. 4 is an isolated perspective view of a specially adapted transport container for accepting mailpieces from the escort assemblies.

Referring additionally to FIG. 4, the containment device 16 is a transport container 16T which will be subsequently used for delivery of stacked mailpieces in a transport vehicle. Alternatively, the containment device may be an interim container (shown in subsequent views) operative to deposit stacked mailpieces into a subsequent container (which may or may not be used for delivery).

Inasmuch as the transport container 16T will be used repeatedly, it will be necessary for its construction to be sufficiently robust for continuous use in a delivery capacity. More specifically, the transport container 16T includes a base 16B, vertical walls 16V extending from the base 16B and an open end 160 for accepting the mailpieces (not shown in FIG. 4) therein. At least one of the vertical walls 16V defines a vertical slot 16S formed in at least one of the vertical walls 16V thereof. Inasmuch as it will be desirable to stack the mailpieces one atop the other, the transport container 16T includes several abutment surfaces, i.e., recesses and detents, to enable stacking on an angle relative to the horizontal. This transport container stacking feature will be better understood following a discussion of the mailpiece stacking operation, discussed in subsequent paragraphs below.

Returning to FIGS. 3*a*-3*c*, the transport mechanism 30 includes first and second transport segments 32, 34, respectively. The first transport segment 32 is operative to convey the clamp assemblies 14 and the respective mailpieces 12 over the open end 160 of each transport container 16T. The second transport segment 34 is operative to lower the clamp assemblies 14 and the respective mailpieces 12 into the open end 160 of the transport container 16T such that an edge of the mailpieces 12 are aligned along one of the vertical walls 16V of the transport container 16T. Furthermore, the second transport segment 34 changes the orientation of the clamp assembly 14 from a first to a second plane. That is, while the clamp assemblies 14 are conveyed by the first transport segment 32, the mailpieces 12 are aligned in a first, substantially vertical plane VP. As the clamp assemblies 14 transition to the second transport segment 34, the clamp assemblies assume a second orientation and are aligned in a second, substantially horizontal plane HP. While the precise planar position of each of the clamp assemblies 14 can deviate from the reference vertical and horizontal planes VP, HP, it should be understood that the second transport segment can change the planar position of the clamp assemblies 14 from as little as sixty degrees (60.degree.) to as much as one-hundred and twenty degrees (120.degree.). Furthermore, while the first transport segment 32 is shown as being substantially linear and the second transport segment 34 is shown as being substantially arcuate, the transport mechanism 30 may comprise a variety of curvilinear segments to achieve the desired planar orientation of the clamp assemblies 14 and respective mailpieces 12.

In addition to changing the planar orientation of the clamp assemblies, the second transport segment 34 is operative to place the clamp assemblies 14 through the vertical slot 16S of the transport container 16T. That is, a portion of each clamp assembly extends through the slot 16S such that the mailpiece 12 nearly abuts one side of the slotted vertical wall 16V while an outboard portion of the clamp assembly 14 passes through the vertical wall 16V. Furthermore, it should be appreciated that the width dimension of the vertical slot 16S is dictated by the corresponding width dimension of the clamp assemblies 14.

Figure 5:
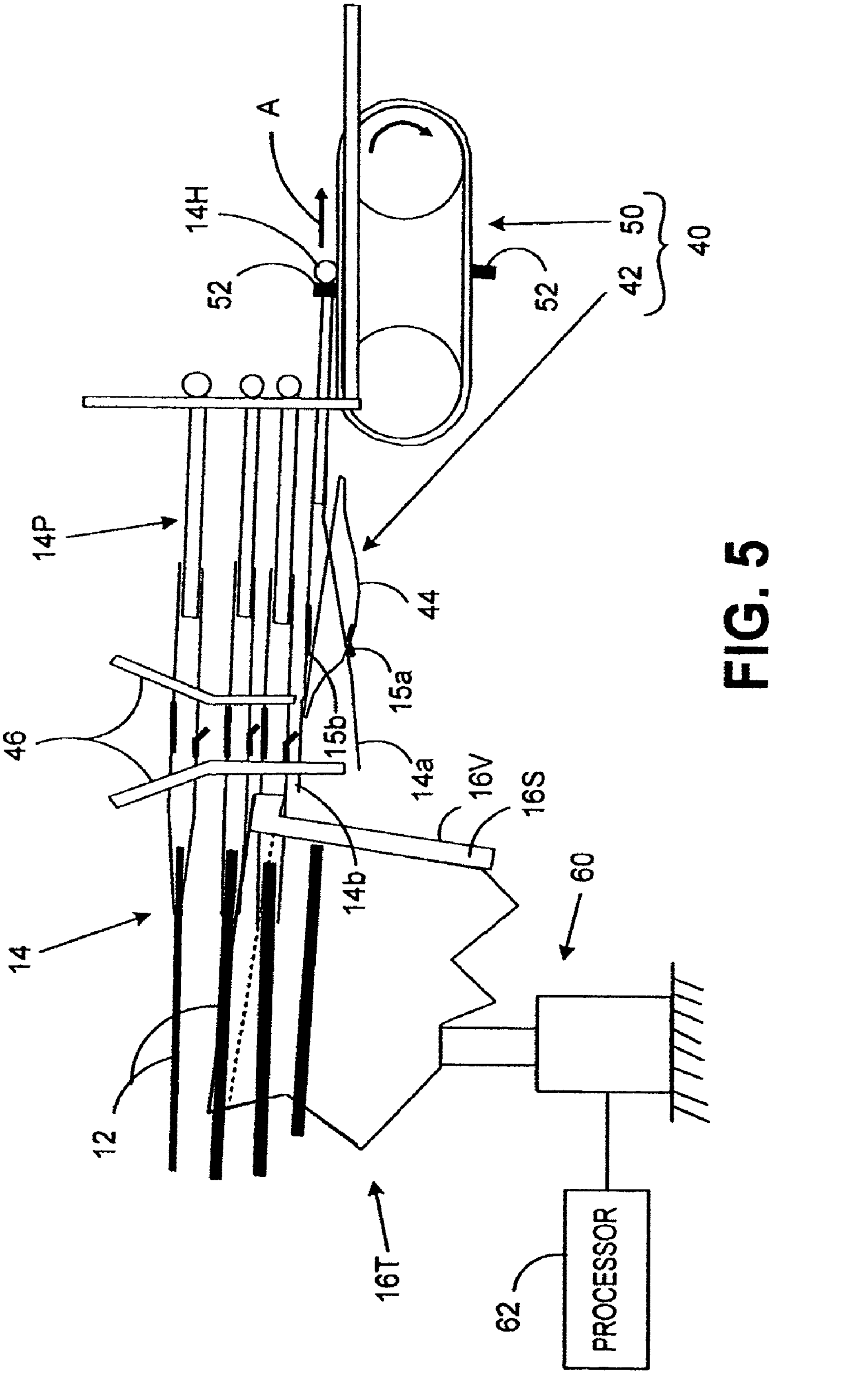
FIG. 5 is an enlarged view of the detachment mechanism for releasing the mailpieces into the containment device.

In FIG. 5, the outboard portion 14P of the clamp assembly 14 is coupled to a detachment mechanism 40 which is operative to release the mailpieces 12 from the clamp assembly 14 and move the clamp assembly through the vertical slot 16S of the transport container 16T. While the detachment mechanism 40 may comprise a variety of structural elements for performing the combined functions, in the described embodiment, a cam mechanism 42 and a conveyor mechanism 50 cooperate to release the mailpiece 12 and pull the clamp assembly 14 through the vertical slot 16S. More specifically, the cam mechanism 42 includes a cam surface 44 which interposes the clamp assembly tabs 15*a*, 15*b*. Additionally, vertically protruding fingers 52 of the conveyor mechanism 50 engage a T-shaped hanger 14H of the clamp assembly 14 to pull the clamp assembly 14 in the direction of arrow A. As the clamp assembly 14 is pulled, the tabs 15*a*, 15*b* of the clamp assembly 14 engage the linear cam surface 44 of the cam mechanism 40. The linear movement of the clamp assembly 14 spreads the jaws 14*a*, 14*b* thereof to release the mailpieces 12, thereby aligning the same along the vertical wall 16V of the transport container 16T. To ensure that the tabs 15*a*, 15*b* are laterally aligned with the cam mechanism 42, a pair of vertical guides 46 may be employed to direct the tabs 15*a*, 15*b* to the tip end of the cam mechanism 42.

To prevent the mailpieces 12 from falling a vertical distance within the transport container 16T, i.e., to the base of the container, and misalignment of the mailpieces 12 as a consequence thereof, the transport container 16T may be positioned to minimize the vertical distance from the clamp assembly 14 to the base 16B of the transport container 16T or to the top of the cumulating stack. More specifically, a mechanism 60, coupled to the transport container 16T, may be employed to raise and/or lower the transport container to ensure that the fill level of the mailpiece stack is consistent with the vertical height of the detachment mechanism 40. Consequently, the mailpieces 12 may be stacked, one on top of another, in a controlled manner, falling only a small vertical distance upon their release from the detachment mechanism.

Additionally, the rate of descent of the transport container 16T may be controlled by a processor 62 based upon previously measured and stored mailpiece thickness information. That is, the system 20 of the present invention may be used in combination with a thickness profile measurement device, such as that disclosed in commonly-owned, co-pending U.S. patent application Ser. No. 11/441,988 entitled, "METHOD FOR OPTIMALLY LOADING OBJECTS INTO STORAGE/TRANSPORT CONTAINERS". The subject matter thereof is hereby incorporated by reference in its entirety. More specifically, the thickness measurement data obtained from the thickness measurement device may be stored in memory and used by the processor 62 to calculate the fill rate of the container 16T. If, for example, the container 16T is to be filled by a plurality of relatively thick magazines and newspapers, the rate of descent may be increased to accommodate the increased fill rate of the mailpieces 12 deposited in the container 16T. On the other hand, if relatively thin conventional envelopes are the representative mix of mail entering the transport container 16T, then the descent rate may be decreased to allow a sufficient thickness of mailpieces 12 to develop before moving the transport container 16T downward.

Figure 6A:
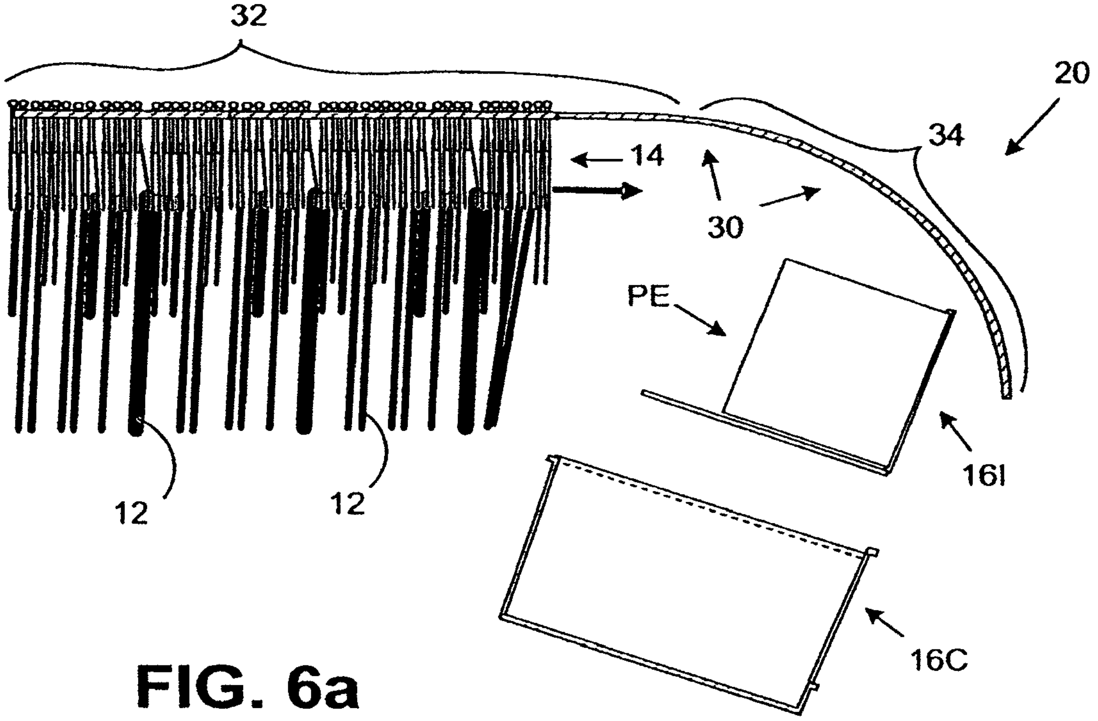
FIGS. 6*a*-6*c* depict a side view of a second embodiment of the inventive system including an interim container for accepting mailpieces from the escort assemblies and depositing the stacked mailpieces into a secondary or subsequent mailpiece container.
Figure 6B:
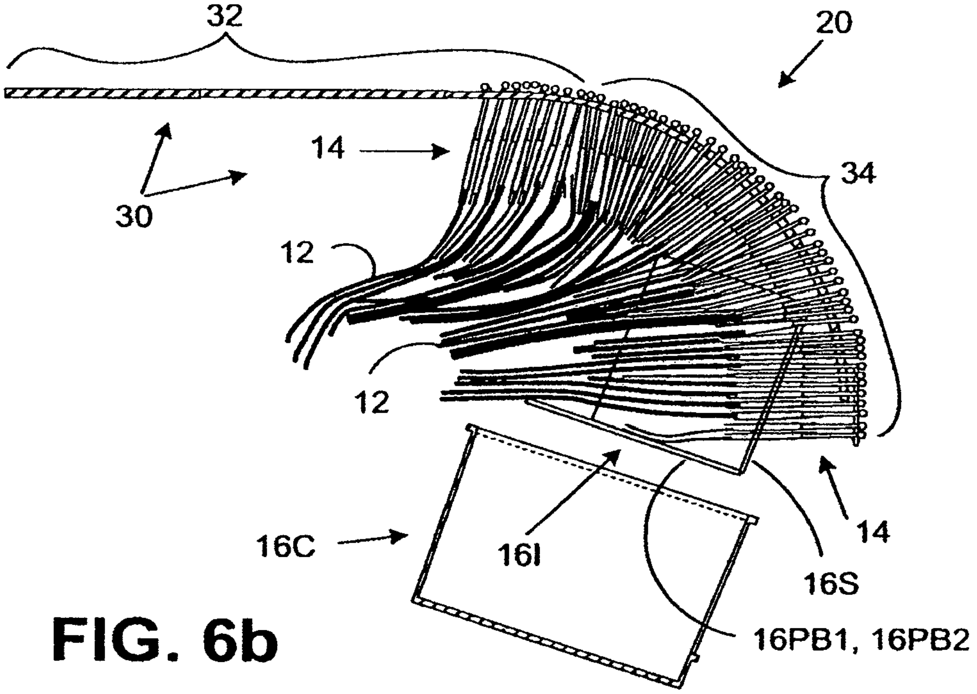
Figure 6C:
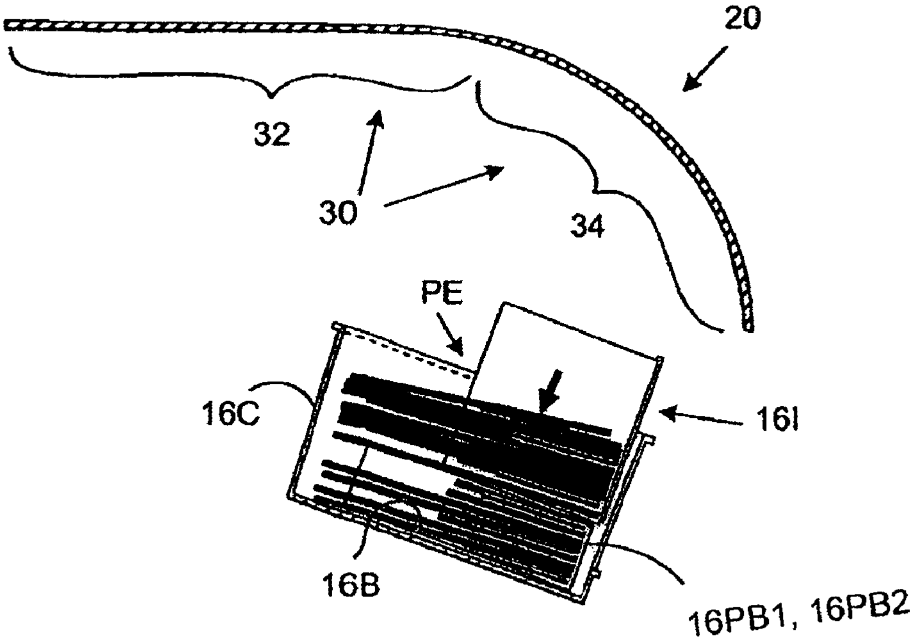
Figure 7:
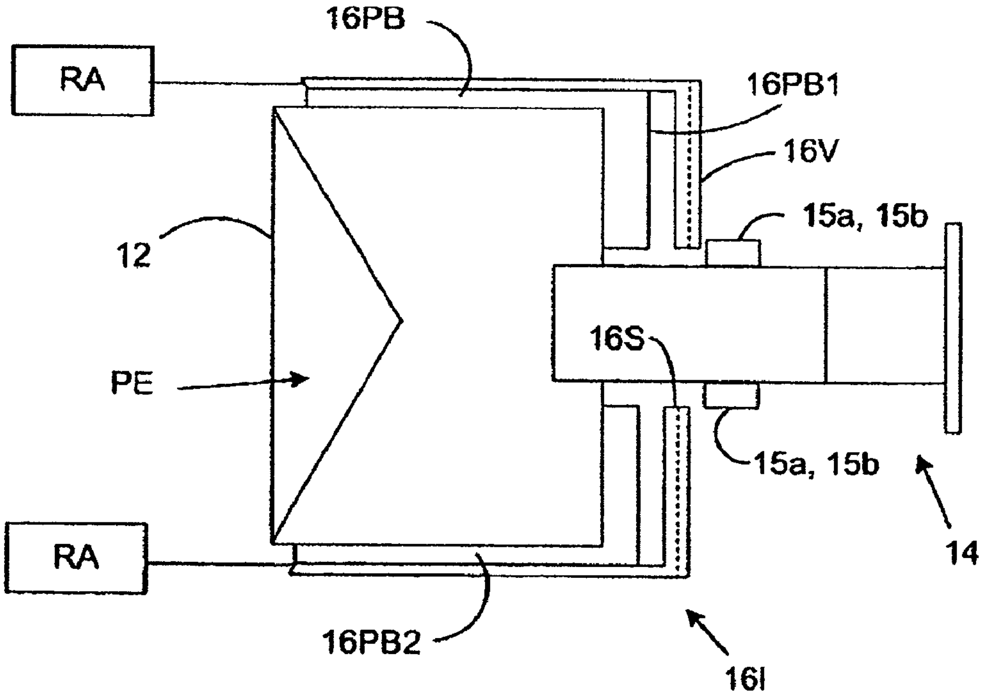
FIG. 7 is a top view of the interim container shown in FIGS. 6*a* through 6*c*.

In yet another embodiment of the invention and referring to FIGS. 6*a*-6*c*, the containment device is an interim container 16I for stacking mailpieces 12 in a first operation and depositing the stacked mailpieces 12 in a conventional mailpiece container 16C. The transport and detachment mechanisms 30 and 40 are the same as those previously described with respect to loading the transport container 16T depicted in FIGS. 3*a*-3*c*. Consequently, no additional discussion is necessary or warranted with respect to these elements. Suffice it to say, that the transport mechanism 30 is operative to convey the clamp assemblies 14 and respective mailpieces 12 over an open end of the interim container 16I, and lower the clamp assemblies 14 and respective mailpieces 12 into the open end of the interim container 16I. Likewise, the detachment mechanism is operative to release the mailpieces 12 from the respective clamp assemblies 14 while moving the clamp assemblies 14 through a slot 16S formed through a vertical wall 16V of the interim container 16I.

Referring to FIGS. 6*a*, 6*b*, 6*c* and 7, the interim container 16I comprises at least one pivotable base 16PB and vertical walls 16V extending from the pivotable base 16PB to define a partial enclosure PE. Inasmuch as the interim container 16I is not used for subsequent mailpiece transport, the aft end of the container 16I is open to facilitate the lowering and stacking of mailpieces 12 within the interim container 16I. While the interim container 16I is being filled, the container 16I is lowered into the mailpiece container 16C such that the stacked mailpieces 12 may be subsequently released into the mailpiece container 16C. More specifically, the pivotable base 16PB may include a pair of trap doors 16PB1, 16PB2 which are pivoted to an open position by rotary actuators RA. As such, the mailpieces are released as a full stack (rather than piece-by-piece) into the mailpiece container 16C disposed below the trap doors 16PB1, 16PB2.

While the interim container 16I may be lowered into the mailpiece container 16C, it should be appreciated that either or both containers 16I, 16C may be spatially positioned to minimize the vertical distance from the trap doors 16PB1, 16PB2 of the interim container 16I to the base 16B of the mailpiece container. After releasing the accumulator stack of mailpieces into container 16C, the interim container is moved back to its initial position, the trap doors 16PBI and 16PB2 rotated open so that interim container 16I is ready to begin receiving the next batch of mail to be stacked. The filled container 16C is removed and replaced with an empty container.

Figure 8:
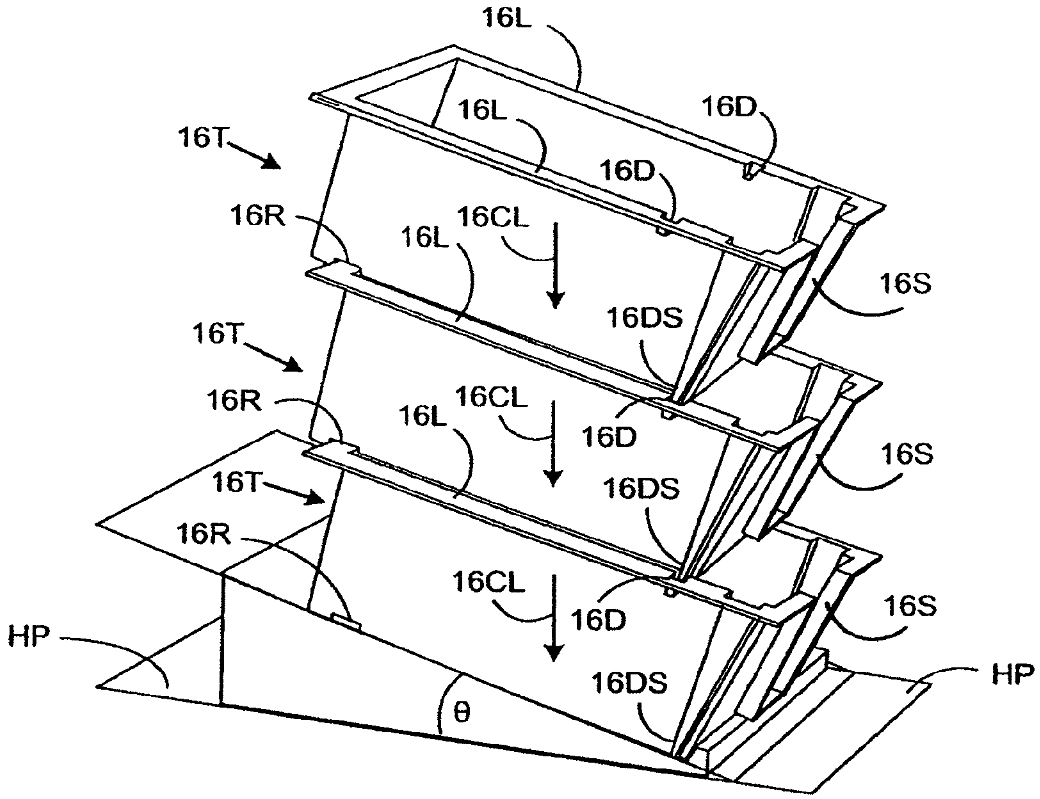
FIG. 8 is a perspective view of several transport containers which have been stacked on an angle relative to the horizontal to mitigate mailpiece movement during transport.

When the mailpieces 12 have been stacked and aligned along an edge or vertical wall of the transport or mailpiece containers 16T, 16C, it is generally desirable to retain alignment of the mailpieces 12. In FIGS. 4 and 8, the transport container 16T has been specifically adapted to maintain mailpiece alignment during transport in a delivery vehicle, i.e., a vehicle subject to vibrations and other perturbations tending to disrupt the order and alignment of the mailpieces 12.

It is to be understood that all of the present figures, and the accompanying narrative discussions of preferred embodiments, do not purport to be completely rigorous treatments of the methods and systems under consideration. A person skilled in the art will understand that the steps of the present application represent general cause-and-effect relationships that do not exclude intermediate interactions of various types, and will further understand that the various structures and mechanisms described in this application can be implemented by a variety of different combinations of hardware and software, and in various configurations which need not be further elaborated herein.

What is claimed:

1. A method for stacking escorted mailpieces into a containment device, the method comprising the steps of:

conveying a plurality of escort assemblies and respective mailpieces in a first plane over the containment device;

spatially repositioning the plurality of escort assemblies and respective mailpieces to a second plane such that the escort assemblies and respective mailpieces are lowered into an open end of the containment device, and releasing the mailpieces from the escort assemblies prior to removing the escort assemblies from the containment device.

2. The method according to claim 1, further including the step of positioning the containment device relative to a position of escort release to minimize the vertical distance from the escort assembly to the top of the cumulating stack.

3. The method according to claim 1, further comprising the steps of pre-determining a cumulative thickness of mailpieces stacked into the containment device, and positioning the containment device relative to a position of escort release as a function of the cumulative mailpiece thickness.

4. A method for stacking escorted mailpieces into a containment device, the method comprising the steps of:

placing mailpieces into separate escort assemblies of a plurality of escort assemblies;

transporting the separate escort assemblies from a first orientation to a second orientation;

lowering each of the separate escort assemblies into an open end of the containment device when in the second orientation; and releasing the mailpieces from each of the escort assemblies prior to removing the escort assemblies from the containment device.

5. The method according to claim 4, further comprising stacking the mailpieces from each of the escort assemblies in the containment device in a horizontal stacked position.

6. The method according to claim 4, wherein the releasing includes opening the escort assemblies.

7. The method according to claim 6, wherein the opening includes engaging tab portions of the escort assemblies with a cam mechanism.

8. The method according to claim 4, further comprising removing each of the escort assemblies from the containment device, after the mailpieces are released therefrom.

9. The method according to claim 8, wherein the removing the escort assemblies from the containment device includes engaging a portion of each of the escort assemblies with a vertically protruding finger of a conveyor mechanism.

10. The method according to claim 9, further comprising moving the conveyor mechanism when the vertically protruding finger engages the portion of each of the escort assemblies such that the escort assemblies are slid from within the containment device.

* * * * *